United States Patent
Willis

(10) Patent No.: US 7,590,743 B2
(45) Date of Patent: Sep. 15, 2009

(54) METHOD AND SYSTEM FOR ASSOCIATING A PROCESS ON A MULTI-USER DEVICE WITH A HOST ADDRESS UNIQUE TO A USER SESSION ASSOCIATED WITH THE PROCESS

(75) Inventor: Michael John Willis, Deerfield Beach, FL (US)

(73) Assignee: Softricity, Inc., Redmond, WA (US)

( * ) Notice: Subject to any disclaimer, the term of this patent is extended or adjusted under 35 U.S.C. 154(b) by 650 days.

(21) Appl. No.: 11/016,015

(22) Filed: Dec. 18, 2004

(65) Prior Publication Data

US 2005/0198387 A1 Sep. 8, 2005

Related U.S. Application Data

(60) Provisional application No. 60/531,883, filed on Dec. 23, 2003.

(51) Int. Cl.
*G06F 15/16* (2006.01)
(52) U.S. Cl. .................. 709/227; 709/203; 709/220
(58) Field of Classification Search .............. 709/203, 709/220–229
See application file for complete search history.

(56) References Cited

U.S. PATENT DOCUMENTS

| | | | | | |
|---|---|---|---|---|---|
| 6,105,151 | A | * | 8/2000 | Mahalingam et al. | 709/239 |
| 6,314,525 | B1 | * | 11/2001 | Mahalingham et al. | 714/4 |
| 6,393,487 | B2 | * | 5/2002 | Boucher et al. | 709/238 |
| 6,445,704 | B1 | * | 9/2002 | Howes et al. | 709/203 |
| 7,082,530 | B1 | * | 7/2006 | Diamant | 713/153 |
| 7,171,492 | B1 | * | 1/2007 | Borella et al. | 709/245 |
| 7,177,898 | B2 | * | 2/2007 | Nakashima | 709/201 |
| 7,219,121 | B2 | * | 5/2007 | Kaniyar et al. | 709/201 |
| 2004/0148326 | A1 | * | 7/2004 | Nadgir et al. | 709/200 |

* cited by examiner

*Primary Examiner*—Phuoc Nguyen
(74) *Attorney, Agent, or Firm*—Woodcock Washburn LLP

(57) ABSTRACT

A method and system for associating a process on a multi-user device with a host address unique to a user session associated with the process begins by allocating a unique host address for the user session and assigning it to a network adapter. Requests that may bind network resources are intercepted, and relevant bind request parameters are manipulated to specify the host address associated with the user session. The original target of the request is invoked with potentially modified parameters.

19 Claims, 5 Drawing Sheets

METHOD AND SYSTEM FOR ASSOCIATING A PROCESS ON A MULTI-USER DEVICE WITH A HOST ADDRESS UNIQUE TO A USER SESSION ASSOCIATED WITH THE PROCESS

CROSS-REFERENCE TO RELATED APPLICATIONS

This application claims the benefit of PPA Ser. No. 60/531,883, filed on Dec. 23, 2003 by the present inventor.

FEDERALLY SPONSORED RESEARCH

Not applicable.

SEQUENCE LISTING OR PROGRAM

Not applicable.

FIELD OF THE INVENTION

This invention relates, in general, to multi-user operating system environments, and, more particularly, to a system and method for associating a process on a multi-user device with a host address unique to a user session associated with the process.

BACKGROUND OF THE INVENTION

A multi-user device allows for multiple users to use the same computer at the same time and/or different times. A multi-user device might include, for example, a workstation that implements multiple user accounts such as Linux, Unix, Windows 2000 and Windows XP, among others, as well as remote access technologies such as Microsoft Windows Terminal Services, Citrix MetaFrame Services and the like. In addition to workstation, remote access, and home computer type devices, multi-user devices might also include a variety of appliances such as cash registers, office equipment, set top boxes, home automation controls, and the like in which multiple people or software processes may use the machine at the same time or at different times.

Multi-user operating systems generally run application programs in the context of a particular user session. A user session is associated with a person. Each user session emulates a single user workstation environment, providing an operating environment similar to that for which most application programs are designed. When multiple user sessions exist on the same multi-user device, it is normally possible for more than one copy of a given application program to be active at the same time.

In multi-user operating systems, a network adapter is a global system resource used to represent a network interface card (NIC) installed on the device. Host addresses are associated with network adapters. Because network adapters are global system resources, they are equally visible to applications running in each user session of a multi-user device. So despite being run in an emulated environment, applications running in one user session of a multi-user device use the same host addresses as applications running in every other user session of the device.

Various application programs designed for single-user devices require exclusive ownership of network resources called ports, which are associated with a host address. Examples include network server, collaboration, peer-to-peer applications, and the like. Many applications request exclusive access to a particular port of every host address assigned to the device, which effectively prevents multiple instances of the application from running even if multiple host addresses are associated with the device. While this may be acceptable on a single-user device, it prevents more than one person from running the application at any given time on a multi-user device.

Various network management tasks would benefit from being able to associate particular network activities and events with specific users. Examples include access control, auditing, bandwidth management, network blocking, network filtering, usage policy management, troubleshooting, quality of service management, prioritization of service, and the like. However, network communication packets are associated only with a host address. In the case of single user devices (e.g., workstations), knowing a host address is often sufficient to correlate network traffic with a user session, since only one user session may be active on a single user device at a time. In multi-user environments, however, the problem of associating a particular user session with network traffic is much more difficult, because the traffic could be associated with any of the user sessions running on the multi-user device.

Some existing applications implementing network management tasks were not designed to operate in an environment that includes multi-user devices, and incorrectly assume that each user session in the environment is associated with a unique host address. These applications may exhibit unreliable behavior, including data corruption, security breaches, and other problems, when deployed in multi-user environments.

Hence, there remains a need for a method and system that assigns a unique host address to each user session in a multi-user environment.

Accordingly, several objects and advantages of my invention are:

(a) to allow many currently inoperable and unreliable application programs to operate properly in a multi-user operating system environment;

(b) to do so without requiring those applications to be modified, redesigned, or recompiled;

(c) to do so without requiring modification, redesign, or recompilation of the operating system itself.

Further objects and advantages of my invention will become apparent from a consideration of the drawings and ensuing description.

SUMMARY

Briefly stated, this invention relates to a system and method for associating a process on a multi-user device with a host address unique to a user session associated with the process. The host address associated with the process is used in all network communication packets sent to or from the process.

In a particular implementation, a host address for a user session is allocated and assigned to a network adapter on a multi-user device. A request by a process running in the user session that may bind network resources is subsequently intercepted, and the host address for the user session is assigned to a bind request. The original target of the request is then invoked with a potentially modified request.

This invention causes all network traffic sent to or from processes in a user session to use a host address unique to the user session, which solves many existing compatibility problems experienced in multi-user environments.

DETAILED DESCRIPTION

Figure 1:
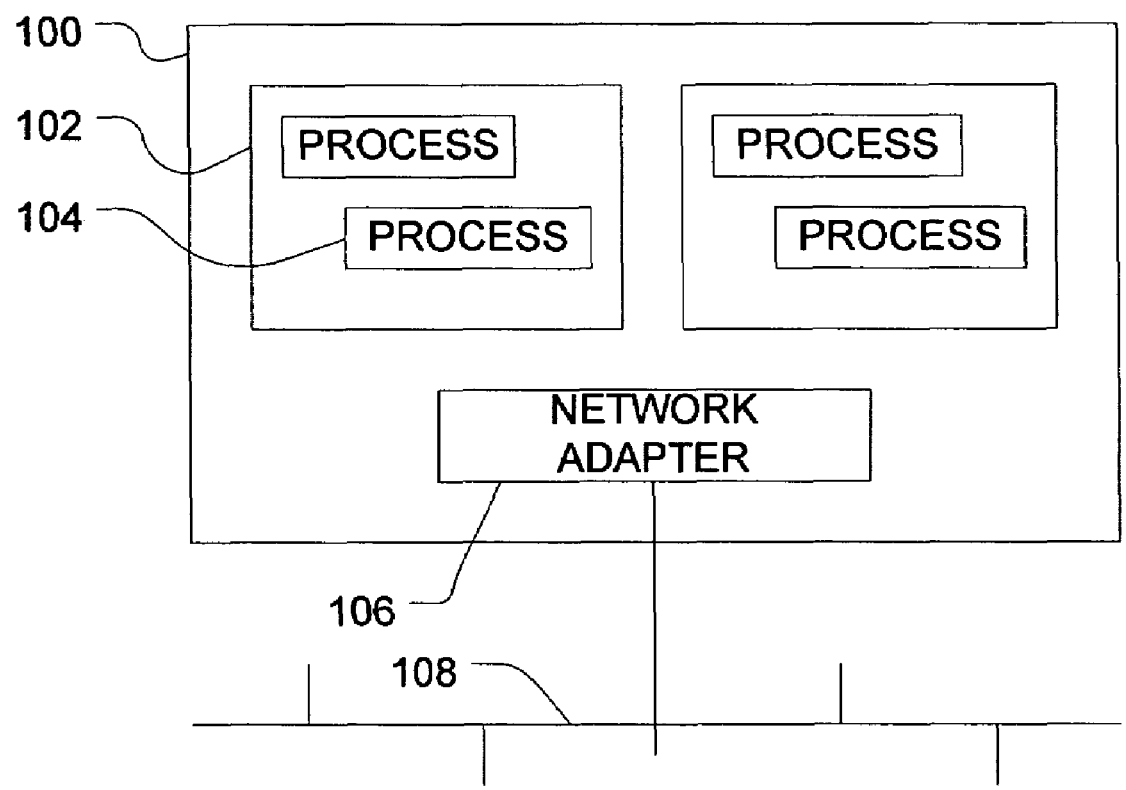
FIG. 1 is a block diagram of a multi-user computer system on which the invention can be practiced.

In brief overview and referring to FIG. 1, a multi-user computer system on which the invention may be practiced includes a multi-user operating system 100 which maintains a plurality of user sessions 102, each of which is associated with a potentially different person. Each user session 102 logically contains a plurality of processes 104, each process 104 representing a running instance of an application program. The multi-user computer system 100 is connected to a network 108 by means of a network adapter 106 controlled by the operating system 100. The network adapter 106 is a global system resource, and is not contained by any user session 102.

Figure 2:
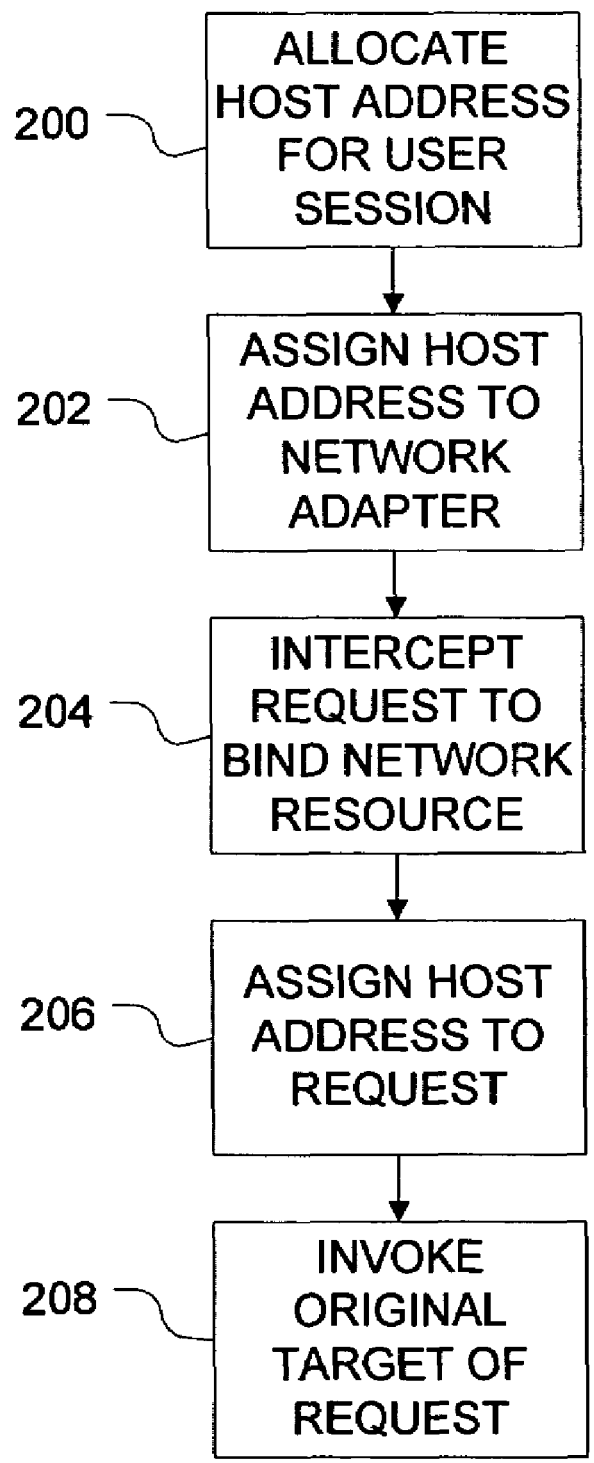
FIG. 2 illustrates operations in accordance with an embodiment of the present invention.

Referring to FIG. 2, and in brief overview, a method for associating a process on a multi-user device with a host address unique to a user session associated with the process, begins by allocating a host address for a user session (step 200) and assigning it to a network adapter (step 202). A request by a process executing in the user session that may bind a network resource is intercepted (step 204). The intercepted request is modified such that the host address associated with it, if any, is replaced with the host address associated with the user session (step 206). Finally, the original target of the request is invoked with the modified request (step 208).

In greater detail, a unique host address is allocated for a user session (step 200). In one embodiment, the unique host address is allocated using the dynamic host configuration protocol (DHCP). DHCP is a network protocol for assigning internet protocol (IP) addresses to devices on a network. Using DHCP, it is possible to request a unique network-address from a pool of network addresses previously configured by a network administrator. In another embodiment, the unique host address is allocated from a pool of addresses maintained in a data table contained in the multi-user device's memory. In yet another embodiment, the unique host address is allocated by choosing an unused address from a configured network subnet.

After a unique host address has been allocated, it is assigned to a network adapter (step 202). In one embodiment, the host address is assigned to a network adapter representing a physical NIC attached to the multi-user device. In another embodiment, the host address is assigned to a virtual network adapter that is unique to the user session.

A request made by a process in the user session that may bind a network resource is intercepted (step 204). A bind request may be explicit, as when a process calls the bind( ) function directly, or it may be implicit, as when a process calls the connect( ) function with an unbound socket.

Requests are generally made using application programming interface (API) calls. In one embodiment, API calls are intercepted by modifying the operating system to contain a replacement function having the same interface and the same name as the original function of the operating system. For example, a new function named "bind" may be provided to replace the "bind" function originally provided with the operating system.

In another embodiment, the original API function provided by the operating system is not replaced, but is modified in order to provide additional functionality associated with the invention. For example, additional code may be added to the existing API function by means of a subroutine or other sub-function inserted into the API function code.

In yet another embodiment, a network transport provider is installed in the operating system in such a way as to be called by the operating system when an application calls the existing API function. Windows 2000 provides an interface known as the service provider interface (SPI) as part of its Platform Software Development Kit (SDK). The SPI allows a program, called a layered service provider (LSP), to extend the operating system's existing networking functionality. A network transport provider is installed as an LSP and intercepts API calls made by user-mode applications using the facilities provided by the SPI.

In yet another embodiment, a device driver is installed in the operating system that uses operating system support to attach to the operating system's existing kernel-mode network drivers. A system service named IoAttachDevice, provided by the Windows 2000 operating system, is used by a filter device driver to attach to an object associated with the TCPIP.SYS network driver. IoAttachDevice allows I/O requests bound for the target device to first be routed to the caller, effectively intercepting network requests.

The intercepted request is modified such that the host address associated with it, if any, is replaced with the host address associated with the user session (step 206). In one embodiment, the intercepted request is modified by overwriting the data associated with the request with new data. In another embodiment, a new request is allocated with new data, and the new request used in place of the intercepted request. In any case, the request later passed to the original target (step 208) comprises similar data to the original request, except that it may contain the host address associated with the user session.

Finally, the original target of the request is invoked with the potentially modified request (step 208).

Figure 3:
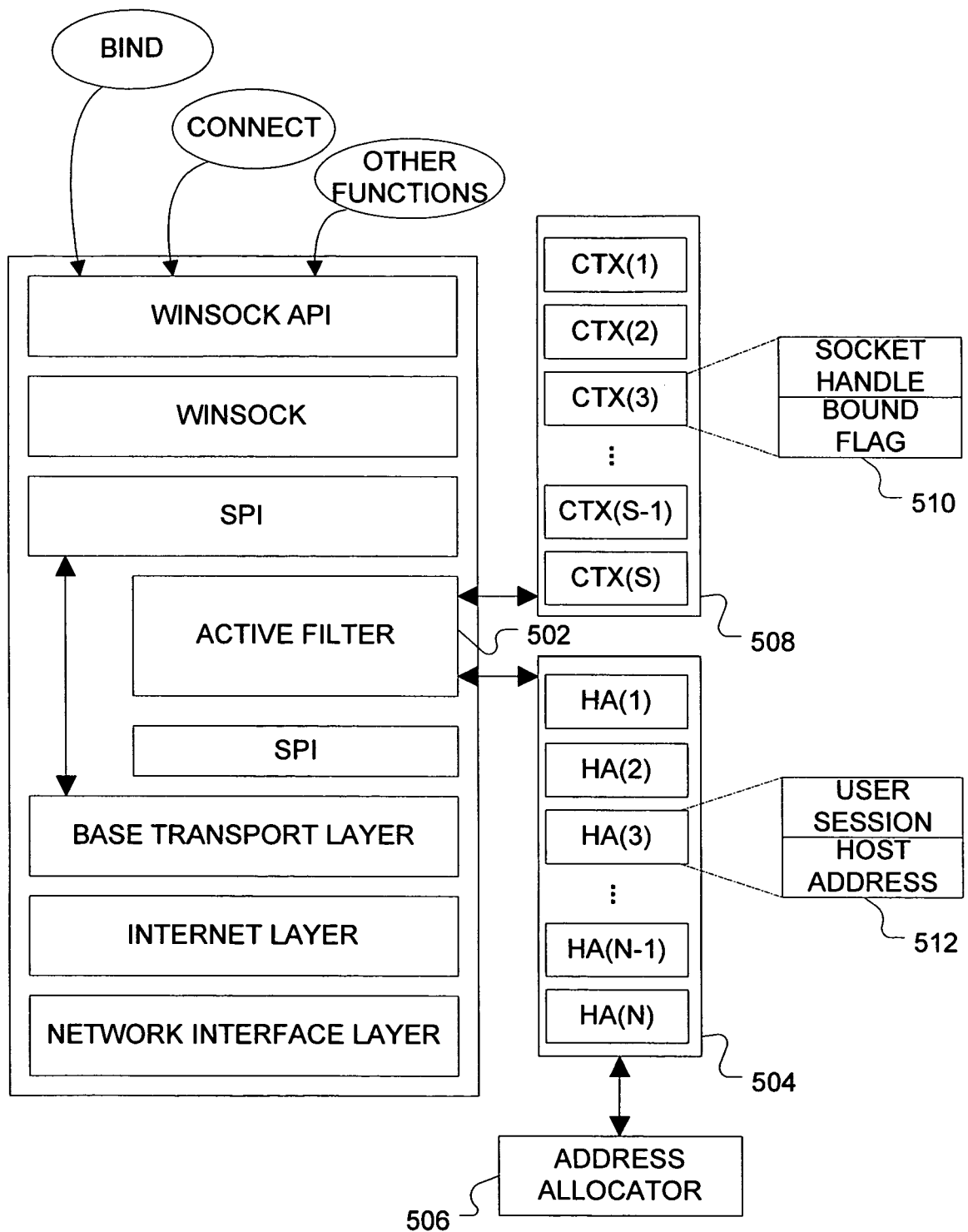
FIG. 3 illustrates entities and data structures that interact in a preferred implementation of the present invention.

FIG. 3 illustrates entities and data structures that interact in a preferred implementation of the present invention. In a Windows environment a process calls bind( ), connect( ), or another of the functions of the Winsock API that may bind network resources. The Winsock processes normally handle the request in the base transport layer. In accordance with the present invention, a request is directed by the service provider interface (SPI) to be handled by the active filter processes 502 rather than being handled by the base protocol layer. The preferred embodiment of the active filter processes 502 is packaged as a layered service provider (LSP), the basic design and operation of which is well-documented in the prior art.

Active filter processes 502 receive the intercepted request. Depending on the nature of the intercepted request, the active filter processes 502 may access a socket context table 508. The socket context table 508 contains information about sockets that have been allocated. Information about each socket is stored in a socket context entry 510. Each socket context entry 510 comprises a socket handle that uniquely identifies the socket and a binary flag that specifies whether or not the socket has been bound.

If the request is WSPSocket( ), the active filter processes 502 create and initialize a socket context entry 510 and place it in the socket context table 508. If the request is WSPCloseSocket( ), the active filter processes 502 access the socket context table 508 and delete the socket context entry 510 associated with the socket handle specified in the request. If the request is WSPBind( ), WSPConnect( ), WSPConnectEx( ), or WSPIoctl( ), the active filter processes 502 access the socket context table 508, locate the socket context entry 510 associated with the socket handle specified in the request, and read or write data from the socket context entry 510.

If the request is WSPBind( ), the active filter processes 502 access a session address mapping table 504. The session address mapping table 504 contains one session address mapping entry 512 for every user session on the multi-user device. The session address mapping table 504 is stored in a section of the Windows registry known that is shared amongst processes running in all user sessions of a multi-user device. The session address mapping table 504 is populated by the address allocator processes 506. Whenever a new user session is created that has no associated host address, the address allocator processes 506 allocate a unique host address using DHCP. The address allocator processes 506 assign the unique host address to an existing network adapter using an operating system function such as AddIpAddress( ), and create and initialize a session address mapping entry 512 before adding it to the session address mapping table 504 where it can later be found by the active filter processes 502.

Figure 4A:
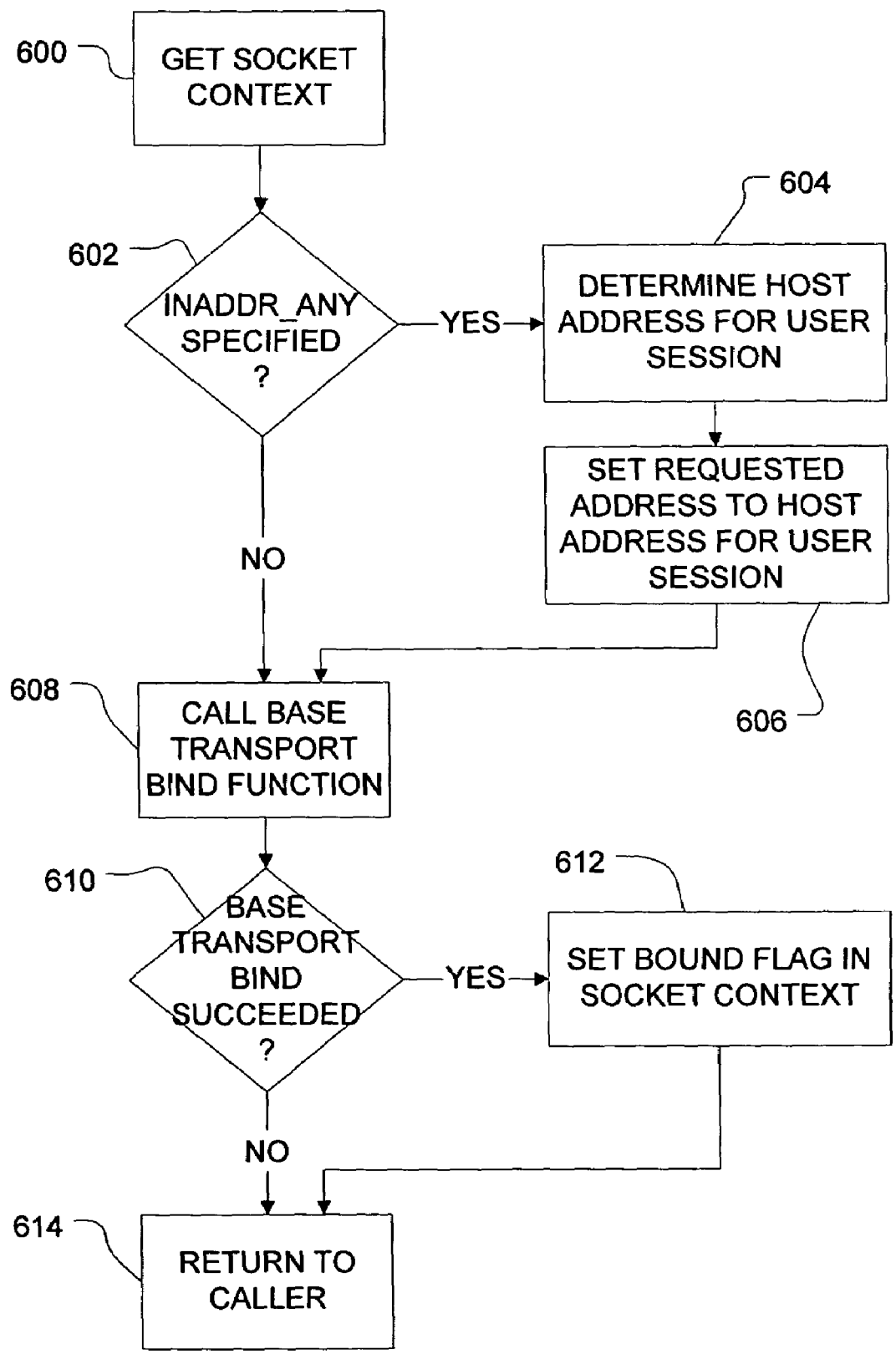
FIG. 4a illustrates detailed operational activities of a WSP-Bind function in accordance with a preferred implementation of the present invention.

FIG. 4a illustrates detailed operational activities in accordance with a preferred implementation of the present invention. Specifically, it describes the steps taken by the active filter processes 502 when the WSPBind( ) function is invoked by the Winsock processes. The socket context entry 510 associated with the socket specified in the request is retrieved (step 600). If the sin_addr field of the name parameter is INADDR_ANY (step 602), the session address mapping entry 512 for the user session is retrieved from the session address mapping table 504 (step 604), and the sin_addr field of the name parameter is replaced with the host address in the retrieved session address mapping entry 512 (step 606). The possibly modified parameters that were passed to the WSPBind function are now used to call the base transport layer's implementation of WSPBind (step 608). If the base transport layer's implementation of WSPBind succeeds (step 610), the bound flag in the retrieved socket context entry 510 is set to TRUE (step 612). The WSPBind function returns to the caller with the return code obtained from the base transport layer's implementation of WSPBind( ) (step 614).

In a similar embodiment, the WSPBind( ) function replaces the sin_addr field of the name parameter with the host address in the retrieved session address mapping entry 512 regardless of the previous value of the sin_addr field. Essentially, getting the socket context (step 600) leads directly to determining the host address for the user session (step 604). The process illustrated in FIG. 4a is preferable when the invention is used in certain environments, and in conjunction with certain existing applications, as it allows processes that intentionally bind to specific host addresses to continue to do so.

Figure 4B:
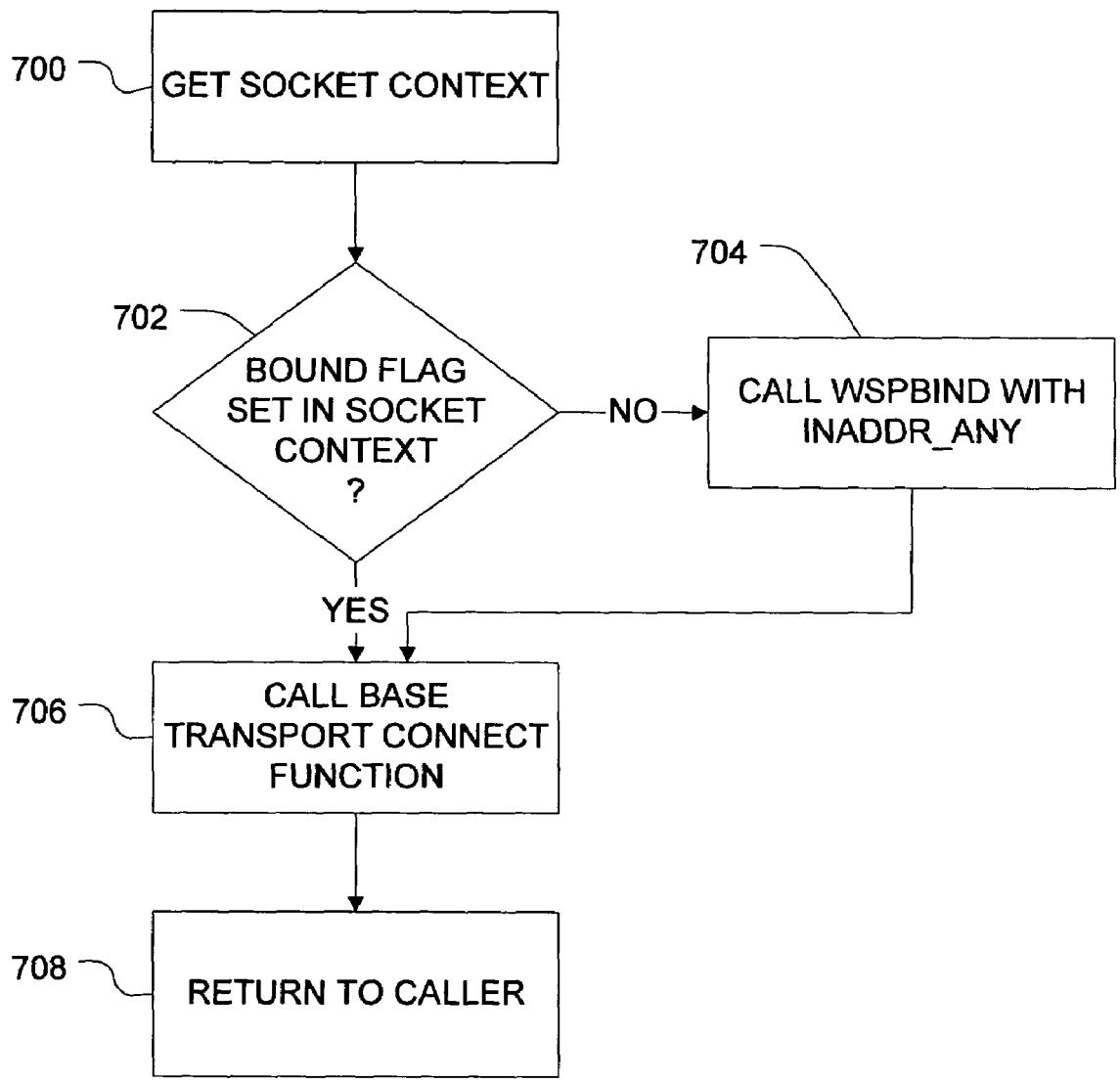
FIG. 4b illustrates detailed operational activities of a WSP-Connect function in accordance with a preferred implementation of the present invention.

FIG. 4b illustrates further detailed operational activities in accordance with a preferred implementation of the present invention. Specifically, it describes the steps taken by the active filter processes 502 when the WSPConnect( ) function is invoked by the Winsock processes. The socket context entry 510 associated with the socket specified in the request is retrieved (step 700). If the bound flag in the retrieved socket context entry 510 is FALSE, the WSPBind( ) function of the active filter processes 502 is invoked (step 704). Examining the call to WSPBind( ) (step 704) more closely, the sin_addr field of the name parameter is set to INADDR_ANY, the sin_port field of the name parameter is set to 0, the sin_family field of the name parameter is set to AF_INET, and the socket parameter is set to the value of socket specified in the WSPConnect request. The parameters that were originally passed to the WSPConnect function are now used to call the base transport layer's implementation of WSPConnect (step 706). The WSPConnect function returns to the caller with the return code obtained from the base transport layer's implementation of WSPConnect( ) (step 708).

The steps taken by the active filter processes 502 when the WSPConnectEx( ) function is invoked by the Winsock processes is identical to that illustrated in FIG. 4b for WSPConnect( ), except that the call to the base transport's implementation of the WSPConnect function (step 706) is replaced with a call to the base transport's implementation of the WSPConnectEx( ) function.

The invention provides a system and method for associating a process on a multi-user device with a host address unique to a user session associated with the process. By allocating a unique host address for each user session, and manipulating intercepted network requests such that processes may only bind to the host address associated with the user session, the invention solves many longstanding problems related to multi-user operating system environments. The invention permits multiple instances of an unmodified network server application to run in different user sessions of a multi-user system by removing contention over host addresses. Furthermore, it allows network tasks running elsewhere on the network to reliably assume that network packets with the same host address are associated with the same user session. Thus the reader will see that the method and system of the invention provides a powerful means for solving compatibility issues in multi-user environments.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

I claim:

1. A method for associating a process on a multi-user device with a host address unique to a user session in which said process is executing, the method comprising:
   (a) allocating a unique host address for said user session, said user session emulating a single user workstation environment, said process executing in said user session;
   (b) assigning said unique host address to a network adapter;
   (c) intercepting a request from said process directed at a default function of the operating system;
   (c-2) identifying a user session in which said process is executing;
   (d) modifying said request by replacing a request host address with the unique host address of the user session in which said process is executing; and
   (e) directing a modified request to said default function of the operating system;
   whereby all network packets sent to or from said process use said unique host address associated with said user session.

2. The method of claim 1 wherein step (a) comprises allocating the host address using a dynamic host configuration protocol.

3. The method of claim 1 wherein step (a) comprises allocating the host address using configuration data accessible using services of the operating system.

4. The method of claim 1 wherein step (a) comprises allocating the host address from an existing pool of host addresses.

5. The method of claim 1 wherein step (c) comprises directing said request to an alternate function, said alternate function replacing said default function and having the same name and being called in the same way as said default function.

6. The method of claim 1 wherein step (c) comprises registering a layered service provider.

7. The method of claim 1 wherein step (c) comprises:
   (c-a) installing a device driver in a multi-user operating system;
   (c-b) attaching a first object related to said device driver to a second object related to a network driver of the operating system;
   whereby network requests bound for said second object are routed first to said first object.

8. The method of claim 1 wherein step (d) further comprises:
   (a) accessing a data table including a plurality of mappings between user sessions and host addresses;
   (b) locating a mapping corresponding to said user session in which said process is executing;
   (c) determining from the mapping entry said unique host address for said user session.

9. A computer readable storage medium that when executed on a processor performs instructions comprising:
   (a) allocating a unique host address for said user session, said user session emulating a single user workstation environment, said process executing in said user session;
   (b) assigning said unique host address to a network adapter;
   (c) intercepting a request from said process directed at a default function of the operating system;
   (c-2) identifying a user session in which said process is executing;
   (d) modifying said request such that it comprises said unique host address of the user session in which said process is executing; and
   (e) directing a modified request to said default function of the operating system;
   whereby all network packets sent to or from said process will use said unique host address associated with said user session.

10. The computer readable storage medium of claim 9 that when executing on a processor further performs instructions comprising allocating the host address using a dynamic host configuration protocol.

11. The computer readable storage medium of claim 9 that when executing on a processor further performs instructions comprising allocating the host address using configuration data accessible using services of the operating system.

12. The computer readable storage medium of claim 9 that when executing on a processor further performs instructions comprising allocating the host address from an existing pool of host addresses.

13. The computer readable storage medium of claim 9 that when executing on a processor further performs instructions comprising directing said request to an alternate function, said alternate function replacing said default function and having the same name and being called in the same way as said default function.

14. The computer readable storage medium of claim 9 that when executing on a processor further performs instructions comprising registering a layered service provider.

15. The computer readable storage medium of claim 9 that when executing on a processor further performs instructions comprising:
   (c-a) installing a device driver in a multiuser operating system;
   (c-b) attaching a first object related to said device driver to a second object related to a network driver of the operating system;
   whereby network requests bound for said second object are routed first to said first object.

16. The computer readable storage medium of claim 9 that when executing on a processor further performs instructions comprising:
   (a) accessing a data table including a plurality of mappings between user sessions and host addresses;
   (b) locating a mapping corresponding to said user session in which said process is executing;
   (c) determining from the mapping entry said unique host address for said user session.

17. A system for associating a process on a multi-user device with a host address unique to a user session corresponding to the process, the method comprising:
   (a) a processor;
   (b) a module that allocates a unique host for the user session, whereby all network traffic sent to or from the corresponding process use the unique host address, said user session emulating a single user workstation environment, said process executing in said user session;
   (c) a module that assigns the unique host address to a network adapter;
   (d) an interceptor that registers a layered service provider, and intercepts a request sent from the process to a default function of an operating system by (i) installing a device driver in a multi-user operating system, and (ii) attaching a first object related to said device driver to a second object related to a network driver of the operating system, whereby network requests bound for said second object are routed first to said first object;
   (e) a modifier that replaces a request host address of the request with the unique host address by (i) accessing a data table including a plurality of mappings between user sessions and host addresses (ii) locating a mapping corresponding to said user session in which said process is executing; and (iii) determining from the mapping entry said unique host address for said user session;
   (f) a director that sends the modified request to the default function of the operating system.

18. The system of claim 17, wherein module (b) comprises one from a set of modules, the set comprising, a module that allocates the host address using a dynamic host configuration protocol, a module that allocates the host address using configuration data accessible using services of the operating system, and a module that allocates the host address from an existing pool of host addresses.

19. The system of claim 18, wherein the interceptor comprises a module to direct said request to an alternate function, said alternate function replacing said default function and having the same name and being called in the same way as said default function.

* * * * *